(12) United States Patent
Koushanfar et al.

(10) Patent No.: US 8,966,660 B2
(45) Date of Patent: Feb. 24, 2015

(54) METHODS AND SYSTEMS OF DIGITAL RIGHTS MANAGEMENT FOR INTEGRATED CIRCUITS

(75) Inventors: Farinaz Koushanfar, Houston, TX (US); Miodrag Potkonjak, Los Angeles, CA (US)

(73) Assignees: William Marsh Rice University, Houston, TX (US); The Regents of the University of California, Oakland, CA (US)

(*) Notice: Subject to any disclaimer, the term of this patent is extended or adjusted under 35 U.S.C. 154(b) by 815 days.

(21) Appl. No.: 12/537,978

(22) Filed: Aug. 7, 2009

(65) Prior Publication Data

US 2010/0122353 A1 May 13, 2010

Related U.S. Application Data

(60) Provisional application No. 61/190,050, filed on Aug. 7, 2008, provisional application No. 61/111,992, filed on Nov. 6, 2008.

(51) Int. Cl.
*G06F 21/02* (2006.01)
*G06F 21/10* (2013.01)

(52) U.S. Cl.
CPC ..................................... *G06F 21/10* (2013.01)
USPC .................... 726/33; 726/26; 726/32; 726/34

(58) Field of Classification Search
USPC ................................................ 726/26, 32–34
See application file for complete search history.

(56) References Cited

U.S. PATENT DOCUMENTS

| 6,161,213 A | 12/2000 | Lofstrom et al. |
| 6,584,214 B1 | 6/2003 | Pappu et al. |
| 6,600,686 B2 | 7/2003 | Huh et al. |

(Continued)

FOREIGN PATENT DOCUMENTS

CA  2482635  10/2003

OTHER PUBLICATIONS

Yousra M. Alkabani et al. "Active Hardware Metering for Intellectual Property Protection and Security" 16th Usenix Security Symposium—web page last updated Jun. 7, 2007 (24 pages).*
Alkabani, Y. et al. "Remote activation of ICs for piracy prevention and digital right management" IEEE/ACM International Conference on Computer-Aided Design 2007 (pp. 674-677).*

(Continued)

*Primary Examiner* — Joseph P Hirl
*Assistant Examiner* — Thomas Gyorfi
(74) *Attorney, Agent, or Firm* — Winstead PC

(57) ABSTRACT

Methods for remote activation and permanent or temporary deactivation of integrated circuits (IC) for digital rights management are disclosed. Remote activation enables designers to remotely control each IC manufactured by an independent silicon foundry. Certain embodiments of the invention exploit inherent unclonable variability in modern manufacturing for the creation of unique identification (ID) and then integrate the IDs into the circuit functionality. Some of the objectives may be realized by replicating a subset of states of one or more finite state machines and by superimposing additional state transitions that are known only to the designer. On each chip, the added transitions signals are a function of the unique IDs and are thus unclonable. The method and system of the invention is robust against operational and environment conditions, unclonable and attack-resilient, while having a low overhead and a unique key for each IC with very high probability.

24 Claims, 4 Drawing Sheets

(56) References Cited

U.S. PATENT DOCUMENTS

| | | | |
|---|---|---|---|
| 6,601,008 B1 | 7/2003 | Madge et al. | |
| 6,941,536 B2 | 9/2005 | Muranaka et al. | |
| 6,946,862 B2 | 9/2005 | Kosuga et al. | |
| 6,952,623 B2 | 10/2005 | McAdams et al. | |
| 7,120,777 B2 | 10/2006 | Adelmann et al. | |
| 7,242,217 B2 * | 7/2007 | van Wageningen et al. | 326/40 |
| 7,454,323 B1 * | 11/2008 | Bain | 703/13 |
| 7,681,103 B2 * | 3/2010 | Devadas et al. | 714/752 |
| 2005/0183047 A1 | 8/2005 | Sapiro et al. | |
| 2006/0209584 A1 * | 9/2006 | Devadas et al. | 365/52 |
| 2006/0210082 A1 | 9/2006 | Devadas et al. | |
| 2006/0221686 A1 | 10/2006 | Devadas et al. | |
| 2006/0271792 A1 | 11/2006 | Devadas et al. | |
| 2006/0271793 A1 | 11/2006 | Devadas et al. | |
| 2007/0038871 A1 * | 2/2007 | Kahlman et al. | 713/193 |
| 2007/0039046 A1 | 2/2007 | Van Dijk et al. | |
| 2007/0183194 A1 | 8/2007 | Devadas et al. | |
| 2008/0231418 A1 * | 9/2008 | Ophey et al. | 340/5.85 |
| 2009/0083833 A1 * | 3/2009 | Ziola et al. | 726/2 |

OTHER PUBLICATIONS

Academia.edu "Remote activation of ICs for piracy prevention and digital right management" © 2014 (1 page) http://www.academia.edu/510386/Remote_activation_of_ICs_for_piracy_prevention_and_ . . . .*

Alkabani, et al., "Active Hardware Metering for Intellectual Property Protection and Security", Proc. 16th USENIX Security Symposium, Article No. 20, USENIX Association, 2007, 16 pages.

Pappu, et al., "Physical one-way functions", Science, 297:2002, pp. 2026-2030.

Gassend, et al., "Silicon physical random functions", in ACM Conference on Computer and Communications Stability (CCS), 2002, pp. 148-160.

Koushanfar, et al., "Hardware Metering", ACM/IEEE-CAS/EDAC Design Automation Conference (DAC), 2001, pp. 490-493.

Koushanfar, et al., "Intellectual Property Metering", Workshop on Information Hiding (IHW), 2137:2001, pp. 87-102.

* cited by examiner

Fig. 3. A non-linear unclonable random unique block.

METHODS AND SYSTEMS OF DIGITAL RIGHTS MANAGEMENT FOR INTEGRATED CIRCUITS

CROSS-REFERENCES TO RELATED APPLICATIONS

This Application claims priority from U.S. Provisional Patent Application No. 61/190,050, filed Aug. 7, 2008 and U.S. Provisional Patent Application No. 61/111,992, filed Nov. 6, 2008, each of which is hereby incorporated by reference as if fully set forth herein.

STATEMENT REGARDING FEDERALLY SPONSORED RESEARCH OR DEVELOPMENT

Not Applicable.

TECHNICAL FIELD

The invention generally relates to electronic security.

More particularly, the invention relates to security measures for computer-based and other electronic appliance-based technologies that help to ensure that information is accessed and/or otherwise used only in authorized ways, while maintaining the integrity, availability, and/or confidentiality of such information and processes related to such use.

The present invention also relates to active hardware metering and more specifically, but not by way of limitation, to protection of integrated circuit designs.

BACKGROUND

The increasing manufacturing cost of integrated circuits (ICs) has bolstered a horizontal semiconductor business model in which designing and manufacturing are performed by different companies. With this type of horizontal business model, digital rights management (DRM) becomes a challenging problem because a designer gives a manufacturer full access to design files, netlists, and test vectors, but then has little control over the actual manufacturing of the ICs based on the design. This lack of control may create a possibility of piracy because fabrication facilities (fabs) used by many designers of electronic hardware are oftentimes untrustworthy and remotely located from the designer. Additionally, the fabs often have the resources and access to the most advanced tools and techniques to facilitate the piracy of the state-of-the-art designs.

Protection of IC designs is important because ICs are widely used in almost all electronic devices. It is estimated that the most commonly pirated electronics are computer hardware, computer peripherals, and embedded systems. Therefore, it is desirable to provide a method that provides a mechanism for protection against the unauthorized use and piracy of integrated circuits and systems.

SUMMARY

In view of the foregoing and other considerations, this application relates to methods and systems of digital rights management for integrated circuits.

In various embodiments, methods are provided for digital rights management of an integrated circuit including manufacturing an integrated circuit according to a design, the integrated circuit having an unclonable characteristic relative to other integrated circuits manufactured according to the design, producing a unique identifier associated with the integrated circuit based upon the unclonable characteristic; generating a digital sequence for the integrated circuit based on the unique identifier of the integrated circuit, wherein the digital sequence is externally generated from the integrated circuit; and using the generated digital sequence to transition the integrated circuit from a locked state to an unlocked state.

In some embodiments, the methods may include wherein the unclonable characteristic of the integrated circuit is due to manufacturing variability. In some embodiments, the methods may also include one or more of inputting an input vector; wherein the unique identifier associated with the integrated circuit is produced in at least partial dependence on the input vector; wherein the unique identifier includes information relative to the locked state; deactivating the integrated circuit by transitioning the integrated circuit from the unlocked state to the locked state; wherein the unclonable characteristic is an assigned identification value stored in permanent memory; storing the generated digital sequence in permanent memory accessible to the integrated circuit; using the stored generated digital sequence to unlock at least a portion of the integrated circuit; coupling the integrated circuit to an artifact; using the generated digital sequence to remotely control the artifact; wherein the artifact is one of a car, a home appliance, a refrigerator, a washing machine, a dishwasher, an alarm system, a digital security system, a weapon, a smart card, and an embedded computer system; remotely locking one of a digital signal processing unit, a configurable integrated circuit, a partially configurable integrated circuit, a general-purpose microprocessor, an application specific microprocessor, a lab-on-a-chip, an embedded system, a network processor, a smart card, a microcontroller, an optical chip, an interface module, a bus driver, a memory control, a memory unit, a computing system, and a communication system; wherein at least a portion of the integrated circuit remains locked when the integrated circuit transitions to the unlocked state; wherein the integrated circuit transitions from a first state to a second state when an event occurs; and/or wherein the event comprises an interval of time ending, a predetermined operational state being reached, or an external input being received.

In some embodiments, an integrated circuit is provided including a first component of the integrated circuit capable of producing an output dependent on an unclonable characteristic of the integrated circuit measured by the first component, the unclonable characteristic being unique relative to integrated circuits having a similar design; a second component that accepts an enabling sequence of input data, the input data being remotely produced in at least partial dependence on the output of the first component; and a functional component that operates according to the input data, wherein the functional component will transition from a locked state to an unlocked state based in at least partial dependence on the input data.

In various embodiments, the integrated circuit may include wherein the unclonable characteristic of the first component is due to manufacturing variability. In some embodiments, the integrated circuit may include one or more of wherein the unclonable characteristic is based in at least partial dependence on an amount of delay in a signal path; wherein the signal path is non-linear and includes a plurality of selector elements, delay elements, and arbiters; wherein the unclonable characteristic is based in at least partial dependence on one of an amount of leakage current and an amount of dynamic current; wherein the unclonable characteristic is based in at least partial dependence on an SRAM-based identification; wherein the enabling sequence of input data is one of a plurality of enabling sequences of input date and the unlocked state is one of a plurality of unlocked states, each enabling sequence of input data operable to transition the functional component to a different unlocked state; wherein the portion of the integrated circuit is a subset of the integrated circuit having a software program running thereon; wherein the portion of the integrated circuit is a subset of the integrated circuit performing predetermined data processes; a plurality of unclonable components, each unclonable component capable of unlocking a portion of the integrated circuit.

In an embodiment, a method for authenticating manufactured ICs for protecting associated design information is introduced. In some embodiments, ICs manufactured from a design may have one or more locks incorporated into functional transitions of the design. In some embodiments, each manufactured IC transitions to a locked state until authenticated by the designer. The manufactured IC may initially power-up to a locked state, thus requiring an initial authentication, and/or may transition to a locked state during use, thus requiring continuous authentication throughout operation.

In some embodiments, manufacturing variability may be utilized to create one or more identifiers (IDs) unique to each IC. The IDs may be utilized to create physically unclonable functions (PUF) that uniquely lock one or more of the IC's functional states to prohibit functionality until unlocked. In some embodiments, the manufacturer of the ICs may request a key unique to each IC to unlock the IC. The locks may be implemented at a high level functionality of the design such that only the designer (e.g., the owner of the design information) can provide the appropriate key that causes transitions from the locked states. Thus, the functional state of each IC can be remotely locked and unlocked, for example, to grant limited access rights to the IC.

In some embodiments, the ability to remotely control the IC may be used for protecting the IC against piracy, for continuous checking of the IC, for granting limited access rights to the chip, for remote enabling and disabling of the ICs, for protecting one or more cores of a multi-core chip, and/or for fingerprinting or watermarking of the design. In some embodiments, a method may be able to continuously and actively check the locks and the keys, thereby allowing active control of disabling and enabling capabilities. Each IC may be continuously, or at a selected moment or state, authenticated by its design information owner or by a core of a multi-core chip which may be instrumented for the authentication process.

In some embodiments, the locks may be distributed among the design's states so that they are computationally difficult to extract from the manufactured ICs, the IC layout files, and/or the netlist sent to the fab. In some embodiments, if an attacker finds a way to partially unlock the IC, the IC may still be able to be locked later during operation of the IC.

The foregoing has outlined some of the features and technical advantages of the present invention in order that the detailed description of illustrative embodiments of the invention that follows may be better understood. Additional features and advantages of the invention will be described hereinafter which form the subject of the claims of the invention.

BRIEF DESCRIPTION OF THE DRAWINGS

The foregoing and other features and aspects of the present invention will be best understood with reference to the following detailed description of a specific embodiment of the invention, when read in conjunction with the accompanying drawings, wherein.

DETAILED DESCRIPTION OF EXEMPLARY EMBODIMENTS

Figure 1:
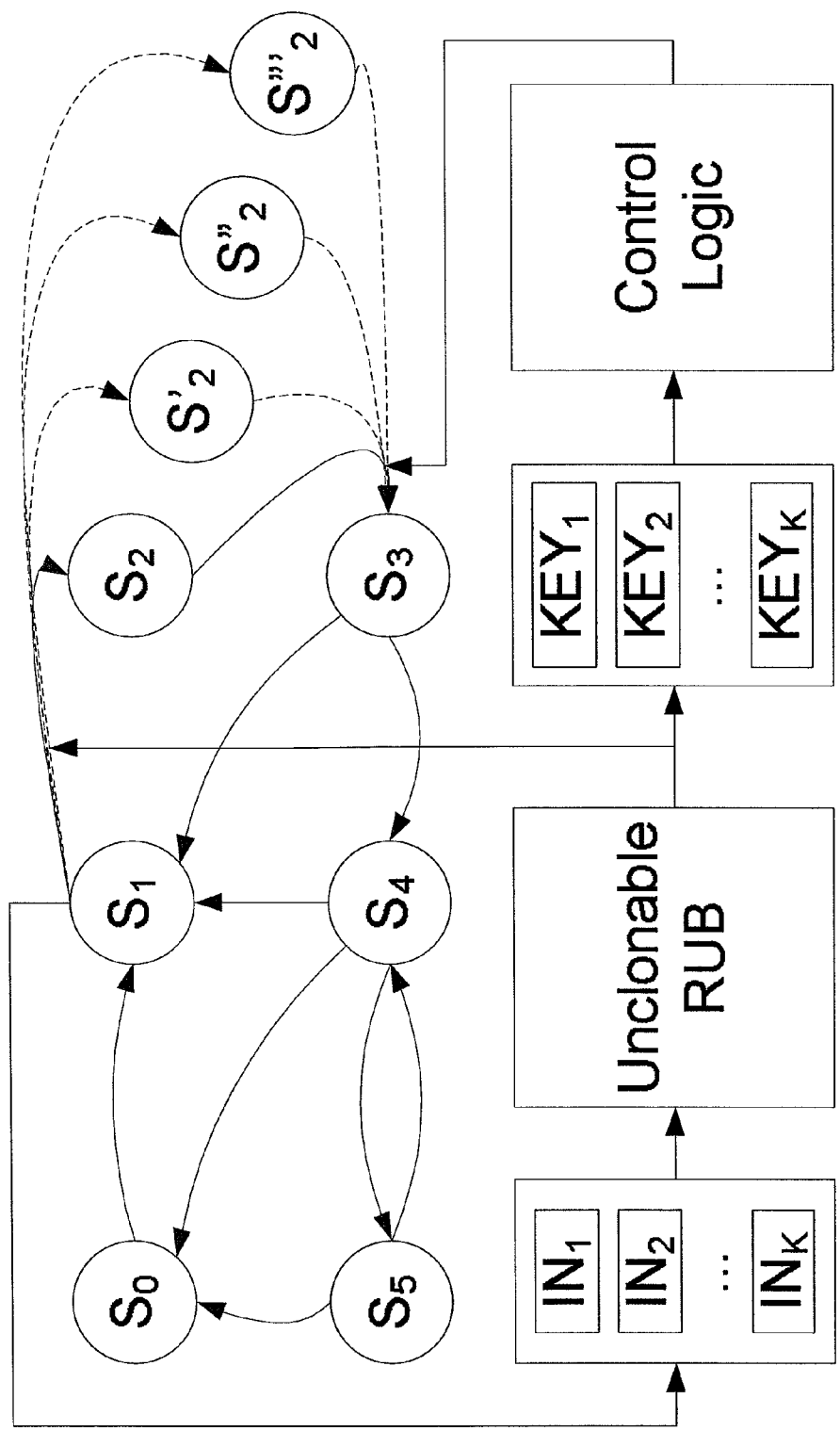
FIG. 1 shows an embodiment of a Finite State Machine (FSM) with a lock on a replicated state.

There are many challenges to protecting integrated circuits (ICs) from piracy, such as, for example: (i) current and future IC tampering attacks may be hard to predict; (ii) numerous attacking strategies exist; (iii) tampering can be conducted at many levels of abstraction of the synthesis process; (iv) the most likely hardware adversaries may be financially strong fabs or foreign governments with large economic resources and technological expertise; and (v) untrustworthy fabs may have full access to the structural specification of design and manufacturing test vectors.

To address the design piracy problem, various watermarking and IC metering protocols may be used. A watermark uniquely identifies each design, but may not be able to uniquely identify each IC manufactured from a given design. IC metering, either passive or active, involves security protocols that allow a designer to create unique IDs for each IC manufactured. The designer may then use the unique IDs to gain at least some post-fabrication control over the produced ICs. In passive metering, the unique ID of each IC is registered into a database so that ICs can be authenticated against the database. In active metering, the ID of each IC is used to lock the functionality of the IC until the designer has authenticated the IC. After authentication, the chip is unlocked, for example, by the designer providing a key to the manufacturer to unlock the IC and allowing the IC to operate properly.

Hardware metering may have applications in both commercial and military hardware manufacturing. For example, without metering, a fab may produce numerous unauthorized copies of a design without paying royalties. Using an active hardware metering method to create a unique unclonable ID for each IC may provide a mechanism for detection of illegal copies and/or may ensure that no manufactured IC can be used without the explicit consent of the designer. Active metering may be integrated into a standard synthesis flow and may be low-overhead, generalizable, and resilient against attacks. Active metering may be generalizable in that the locks may be implemented on structures common to many designs. Active metering may be attack-resilient in that an attacker that does not have infinite computational power should not be able to unlock the IC without knowing the key.

In an embodiment, an IC preferably includes a first component such as a "PUF" or physically unclonable function. The PUF may be combined with a second component which includes, but is not limited to, additional circuitry. In certain embodiments, the combination of the first component and second component create a diverse random unique block (RUB). The RUB is also referred to herein as an unclonable RUB. The RUB employs uniqueness in the circuitry due to manufacturing variability, which in turn makes it difficult to copy and therefore unclonable.

In certain embodiments, inherent manufacturing variability (MV) of the ICs is exploited to generate the unique chip IDs. Intense industrial miniaturization of CMOS devices has been driven by a quest for increasing computational speed and device density, while lowering cost-per-function, as predicted by Moore's law. Different chips fabricated using the same lithography mask will, in general, have somewhat different physical structures. There will almost always be slight variations in a plurality of parameters, such as, for example, length and width of conduction wires, concentration of doping regions, thickness of dielectric layers, and other slight differences due to variations in the manufacturing process. These physical variations are unique to each IC and cause functional differences that can be measured. For example, CMOS variations often result in high variability in the delay and currents of very large scale integration (VLSI) circuits.

The variations that are generated during manufacturing may be utilized to generate unique on-chip IDs as a way to combat design-information piracy. For example, PUFs may be used to map a set of challenges to a set of responses, based on an intractably complex physical system. An application of the PUF is to authenticate the identity of the chip based upon the sets of challenge-response pairs associated with the chip. Upon every successful authentication of a given chip, a set of challenge-response pairs is potentially revealed to an adversary. Because MV may cause delay differences among ICs made from the same mask or design, there is a high probability that each PUF on each IC would be unique.

In certain embodiments, PUFs may be combined with other circuitry to create a Random Unique Block (RUB). Because each PUF is unique, the function of each RUB will vary from chip to chip meaning that, for a given set of inputs, the outputs will vary from chip to chip. The RUB can be utilized to generate RUB outputs that will vary from chip to chip for each RUB input vector. Intertwining the outputs of the RUB into the functionality of the chip can be used to transition a chip into a locked state. The designer, who knows the correct path from an existing state to the next state, would be the only entity to know the correct key to unlock the IC, thereby making the IC functional.

When a designer authorizes a fab to manufacture a certain number of chips, the designer sends a specific set of RUB inputs to the fab along with the chip design. Upon manufacturing, the fab inputs the specific set of RUB inputs into each chip and reports the output of each chip to the designer. Because the RUB function varies from chip to chip, there should be a unique output corresponding to each chip manufactured.

A secret key embedded in a chip can be used to authenticate the chip. Authentication means proving to a user that the chip is not a counterfeit, or proving that certain processing results are processed by the chip and not some other chip. A unique output set corresponding to a chip is sent to the designer, who then sends corresponding keys to the fab to unlock the chips.

In certain embodiments, the specific input sets and corresponding unique keys may be stored on the chip to ensure proper operation. In other embodiments, longer inputs and additional replicated states may be used to increase security.

An embodiment of the invention provides a method for activating an IC using a key exchange mechanism. In this method, first, the designer sends the design files to the fab along with test vectors and instructions regarding the required numbers of copies. Next, the fab manufactures the required number of ICs, applies the test vectors and send the IC output values back to the designer. Using the IC output values received from the fab, the designer computes a digital sequence or key that operates the IC chip. The operation of the key in "decoding" or "unlocking" the IC constitutes the functional component of the IC. The key is then forwarded to the fab who stores the key on the chip and tests the chip in the operational mode.

An embodiment of the invention provides a method for remotely activating an integrated circuit by using a lock and key mechanism. This method enables designers to lock each working IC and to then remotely enable it using a specific digital sequence. In an embodiment of the invention, the remote activation of an IC is carried out by replicating a few states of a finite state machine and adding control to the state transitions. On each chip, the added control signals are based on the unique IDs that are generated as a result of the inherent manufacturing variability (MV) of the ICs, and are thus unclonable.

Referring now to the drawings, wherein depicted elements are not necessarily shown to scale and wherein like or similar elements are designated by the same reference numeral through the several views, a hardware metering method is shown in FIG. 1. A finite state machine (FSM) of a design with six states $S_0$ to $S_5$ is shown, where one of the states ($S_2$) is replicated three times: $S_2'$, $S_2''$, $S_2'''$. Once the design reaches the state $S_1$, it will transition to one of the four replicated states (i.e., $S_2$, $S_2'$, $S_2''$, $S_2'''$), depending on the output of an unclonable RUB. The output of the unclonable RUB not only depends on a number of inputs ($N_1$, $IN_2$, ... $IN_K$), but also depends on a unique ID of the IC. Because of the dependence of the RUB on the unique ID of the IC, the state to which the IC will transition is unpredictable and will vary from chip to chip.

Once the chip has transitioned to one of the replicated $S_2$ states, the chip will not transition to the next state (i.e., $S_3$) until a correct key is provided. The correct key ($KEY_1$, $KEY_2$, ... $KEY_K$) depends on the output of the unclonable RUB, thereby making the key unique to each IC. Unless the correct key corresponding to the unique RUB is provided, no transition to $S_3$ will occur and the IC will therefore be locked.

Figure 2:
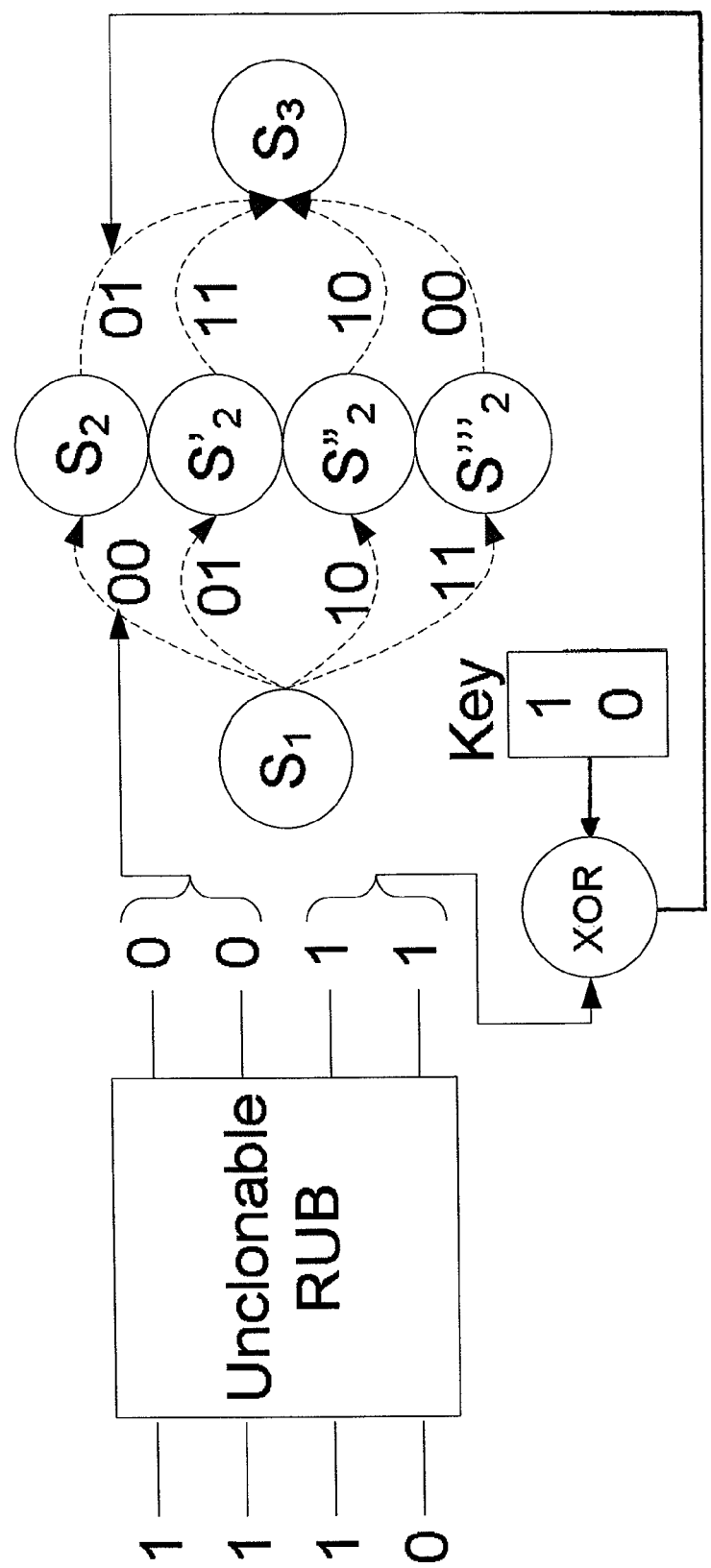
FIG. 2 shows an embodiment of the locking/unlocking mechanism of FIG. 1.

FIG. 2 shows the locking/unlocking mechanism of FIG. 1 in more detail. For ease of discussion, the input to the RUB has been limited to four bits and a two-bit input is shown controlling edge transitions of the FSM, but any number of bits are contemplated. In the embodiment shown, the FSM is in the state $S_1$ and an input key having the value 1110 has produced a corresponding RUB output of 0011 for this particular IC. As shown, the first two bits define the transition to one of the next replicated states ($S_2$). In order to transition from $S_2$ to the next state ($S_3$), an input of 01 is required; otherwise, $S_3$ will not be reached and the IC will remain locked. In the embodiment shown, the next two bits of the RUB output (i.e., 11) are inputted into an XOR gate. In order to generate the 01 needed to enable the transition, a key of 10 is needed so that the output of the XOR gate will be 01. While an XOR gate is shown, the control circuitry could be any gate or combination of gates or could be operated without a gate.

Although a specific embodiment was described above for illustrative purposes, the particular components and circuit design for creating the unique IDs, the PUF, the RUB, and the integration into the functionality of the IC may be accomplished through many different components and designs, different types of PUFs can be used, and the integration can be accomplished at different levels of synthesis abstraction (e.g., synthesis and assignment).

Requiring activation keys to unlock manufactured ICs may allow the designer to remotely activate a limited number of chips produced by the fab. In one embodiment, a designer adds locks to a design by first adding a specified number of replicated states at a given point in the functionality of the design, where the output of the RUB determines which replicated state is transitioned to. At a second step, the designer sends design information such as design files, test vectors, and number of required ICs to the fab. At a third step, the fab manufactures the required number of ICs, applies the test vectors, and sends outputs to the designer. At a fourth step, the designer uses the values sent by the fab and computes a key for unlocking each chip. At a fifth step, the designer sends the keys to the fab and the fab stores the key on the chip and tests the chip in the operational mode.

The input to the RUB and the key may be stored in memory to maintain the proper operation of the circuit. For example, the input memory may be loaded with different values to give read out data to the designer to compute the key. Once the designer computes the key and gives the key to the fab, the key in the memory is loaded to ensure that the transitions that occur as a function of the RUB are correct and that the chip is functional.

Locks can be embedded throughout the design and/or in combination with other circuitry to secure various parts of the chip for a plurality of reasons. For example, on multi-core chips, it may be desirable to unlock less than all of the cores while leaving other cores locked. This partial unlocking can be accomplished by embedding locks on each of the different cores and only providing the correct key to unlock certain cores. Additionally, one core, such as a master core, could be loaded with the keys for unlocking other cores at a later time or in response to a certain input. Similarly, the master core could contain circuitry to lock other cores in response to certain criteria, such as, if pirated software is detected or if the chip was only licensed for a certain period of time.

In one embodiment, a few states of a design are replicated a number of times, such as, for example, for a design having states $S_0$ to $S_n$, state $S_i$ can be replicated four times to get $S_i'$, $S_i''$, $S_i'''$, and $S_i''''$. Each bit added to a state exponentially increases the number of states; therefore, only a few added states are needed to ensure security. For each added state, all the transitions to and from the replicated states may be at least partially dependent on a subset of the bits outputted from the RUB.

For example, half the bits responsible for the transitions to and from the replicated states may come directly from the RUB, while the rest of the bits may come from a key or other input as shown in FIG. 2. In some embodiments, the transitions from the replicated states converge to the same state if they have the correct inputs from the RUB. To maintain proper functionality when the IC operates, the correct key value causes the transition from one of the copies of $S_i$ to the correct next state. In some embodiments, a so-called black hole may be added so that, if a wrong key is inputted, the chip will be permanently locked or will transition to a secured state requiring a complicated key to be inputted.

Figure 3:
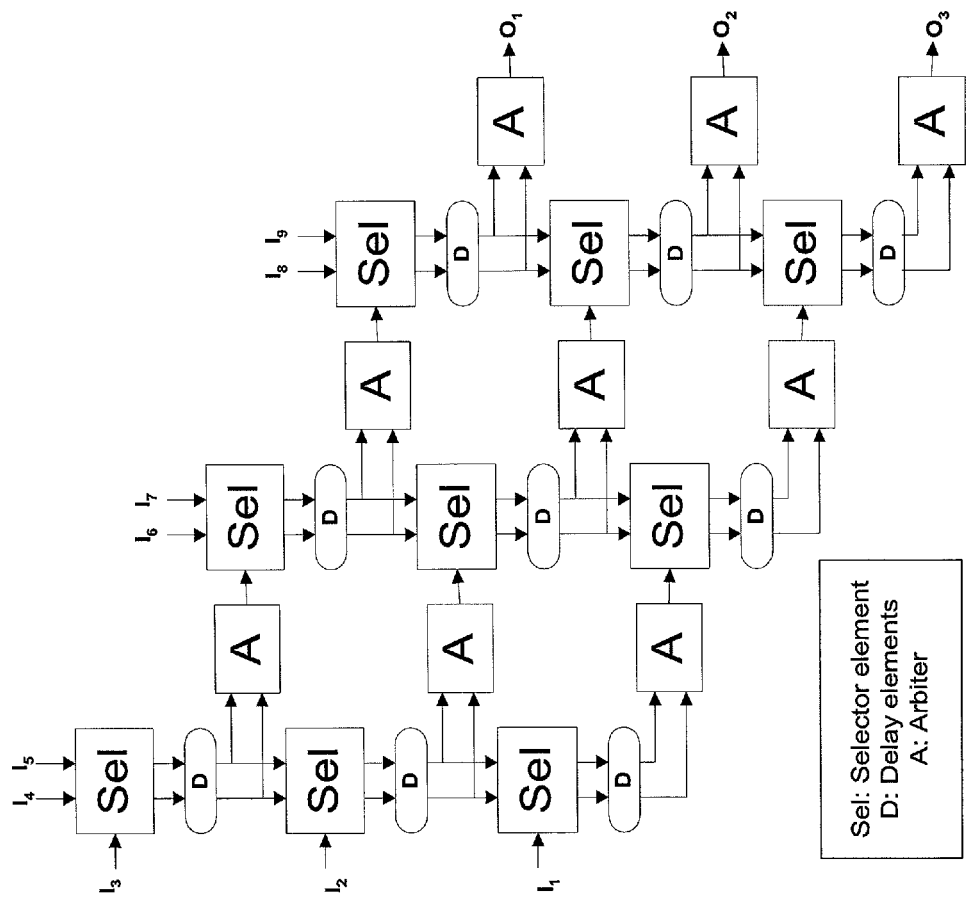
FIG. 3 shows an embodiment of a non-linear unclonable random unique block.

Referring now to FIG. 3, a block diagram of an illustrative non-linear unclonable random unique block (RUB) is shown. The main building blocks of the embodiment shown are selector elements (Sel), delay elements (D), and arbiters (A). In the embodiment shown, the circuit has nine inputs, $I_1$ to $I_9$, and three outputs, $O_1$ to $O_3$. A selector element has two input lines and one selection line. Based on the value of the selection line, the inputs either pass directly to the output or are switched. The arbiter gives an output that depends on the input that arrives first (with the shortest delay). By adding nonlinearity both in the delayed path segments and the segments used by the selectors, the RUB may be hard to characterize, reverse-engineer, reproduce, or model, while its output remains easy to observe.

In some embodiments, a unique string of values may be loaded into a permanent memory of the IC and the unclonable RUB may read the unique string of values to generate the unique ID. In some embodiments, the RUB may measure stray leakage or dynamic current of the IC to generate the unique ID. In some embodiments, the unique characteristics of SDRAM may be utilized to generate the unique ID.

Figure 4:
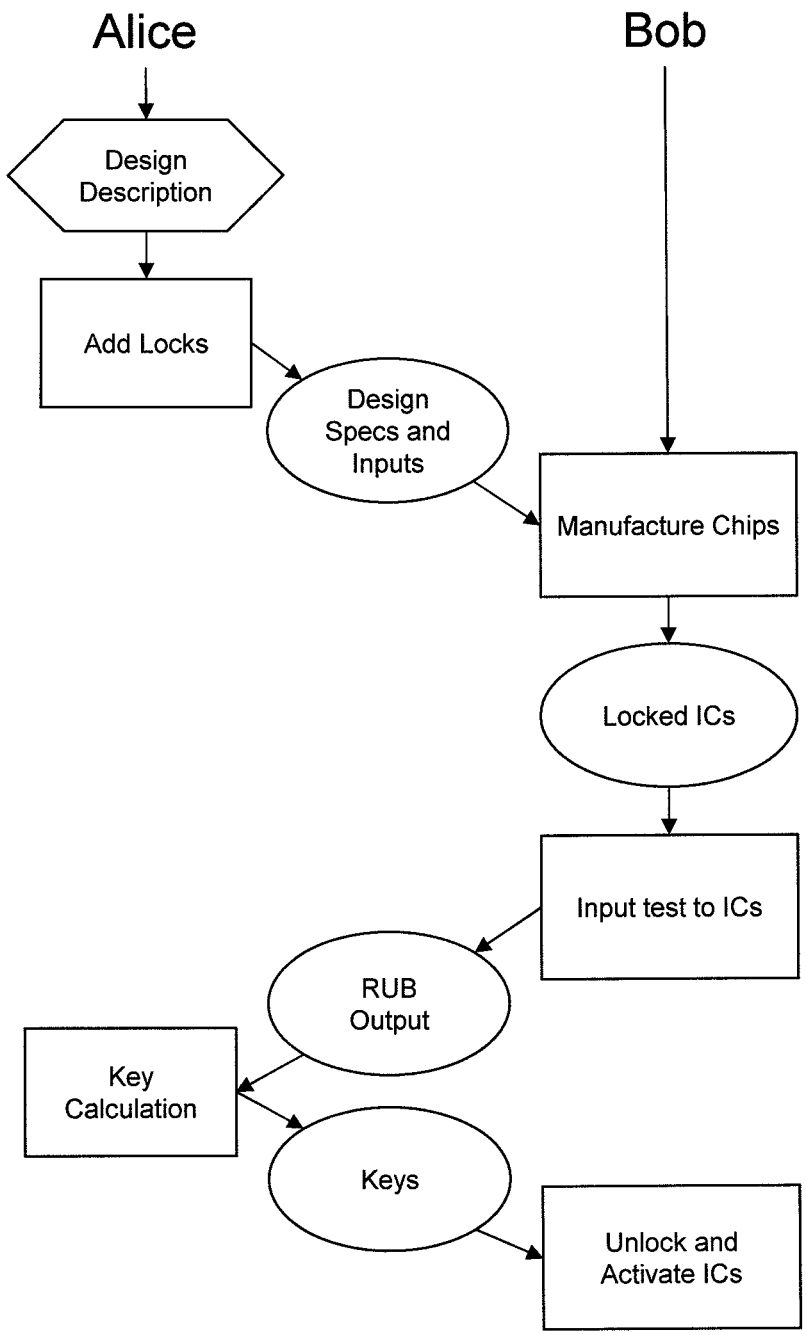
FIG. 4 shows a flow chart of an embodiment of an active metering method of the invention.

Referring now to FIG. 4, a flow chart is shown of a manufacturing scenario in which a design-information owner (Alice) provides hardware design information to a fabrication facility (Bob). Alice sends a design to Bob and pays Bob to manufacture $N_A$ ICs. Bob constructs a mask that implements the design using the design information provided by Alice then uses the mask to make $N_A+N_B$ copies of the design. The illegal $N_B$ copies do not cost Bob much due to the availability of the mask. Because of the negligible overhead, Bob may sell the $N_B$ illegal copies for a large profit.

To prevent the $N_B$ illegal copies from being operable, Alice may add circuitry to the original design to protect her design against piracy. By adding replicated states controlled by a RUB, each manufactured device may be uniquely locked (non-functional) and Bob cannot unlock any IC unless Alice provides the particular key to unlock it. This scheme gives Alice full control over the manufactured parts and operational devices from the design.

In some embodiments, the RUB may be used to remotely disable an unauthorized IC. For example, Alice may save the inputs, outputs, and keys for all the ICs that she has unlocked. Using the chip IDs that are integrated within the functionality, she can add mechanisms that enable her to monitor the activities of the registered chips remotely, for example, if they are connected to the Internet. She can further add transitions from a functional state to a replicated state, to lock the IC in case it is needed. Remote disabling could be used for selective remote programming of the devices, royalty enforcement, or other applications.

From the foregoing detailed description of illustrative embodiments of the invention, it should be apparent that a system for active hardware metering that is novel has been disclosed. Although specific embodiments of the invention have been disclosed herein in some detail, this has been done solely for the purposes of describing various features and aspects of the invention, and is not intended to be limiting with respect to the scope of the invention. It is contemplated that various substitutions, alterations, and/or modifications, including but not limited to those implementation variations which may have been suggested herein, may be made to the disclosed embodiments without departing from the spirit and scope of the invention as defined by the appended claims which follow.

What is claimed is:

1. A method of digital rights management for an integrated circuit comprising:
   creating an augmented design specification for the integrated circuit, wherein one or more states or related state transitions are reorganized in one or more ways;
   manufacturing an integrated circuit according to said augmented design specification, the integrated circuit having an unclonable characteristics relative to other integrated circuits with an identical design;
   producing a sequence of unique identifiers associated with each of the one or more states or related state transitions that have been reorganized, wherein each of the unique identifiers are based upon the unclonable characteristics;
   generating a digital sequence based on the sequence of unique identifiers for a subset of the state transitions of the integrated circuit;
   providing at least a first portion of said digital sequence to a control logic, wherein a control logic output is dependent on said at least first portion of said digital sequence and a key, and the key is externally generated for the integrated circuits; and
   using at least a second portion of the generated digital sequence and said control logic output to enable correct transitions from one state to a next state of a finite state machine of the integrated circuit, wherein the integrated circuit transitions to a locked state during use to require continuous authentication throughout a subset of state transitions.

2. The method according to claim 1 wherein the unclonable characteristic of the integrated circuit is due to manufacturing variability.

3. The method according to claim 1 and further comprising:
inputting a sequence of input vectors; and
wherein the sequence of the unique identifiers associated with the integrated circuit is produced in at least partial dependence on the sequence of input vectors.

4. The method according to claim 1 wherein each of the unique identifiers includes information relative to the current state of the finite state machine.

5. The method according to claim 1 and further comprising:
deactivating the integrated circuit by transitioning from the current state to a state that can not transition to any other state except itself.

6. The method according to claim 1 wherein unique identification values are stored in permanent memory.

7. The method according to claim 1 and further comprising storing the generated digital sequence required for the proper traversal of the finite state machine in permanent memory accessible to the integrated circuit.

8. The method according to claim 7 and further comprising using the stored generated digital sequence to unlock at least a portion of the integrated circuit.

9. The method according to claim 1 and further comprising:
coupling the integrated circuit to an artifact; and
using the generated digital sequence to remotely control the artifact.

10. The method of claim 9, wherein the artifact is one of a car, a home appliance, a refrigerator, a washing machine, a dishwasher, an alarm system, a digital security system, a weapon, a smart card, and an embedded computer system.

11. The method of claim 1 and further comprising:
remotely locking one of a digital signal processing unit, a configurable integrated circuit, a partially configurable integrated circuit, a general-purpose microprocessor, an application specific microprocessor, a lab-on-a-chip, an embedded system, a network processor, a smart card, a microcontroller, an optical chip, an interface module, a bus driver, a memory control, a memory unit, a computing system, and a communication system.

12. The method of claim 1, wherein at least a portion of the integrated circuit requires a part of the digital sequence for proper traversal of the finite state machine.

13. The method claim 1, wherein the requirement for use of the digital sequence required for proper traversal of the finite state machine is activated or deactivated when an event or sequence of events occur.

14. The method of claim 13, wherein the event comprises an interval of time ending, a predetermined operational state being reached, or an external input being received.

15. An integrated circuit comprising:
a first component of the integrated circuit capable of producing a sequence of outputs dependent on an unclonable characteristic of the integrated circuit measured by the first component, the unclonable characteristics being unique relative to integrated circuits having an identical design;
a second component that receives a sequence of input data, wherein said input data comprises a key and at least a first portion of said sequence of outputs, the key being remotely produced in at least partial dependence on the output of the first component, and said second component outputs control logic data that is dependent on said input data; and
a functional component that transitions from one state of a finite state machine to a next state based on at least a second portion of said sequence of outputs from said first component and said control logic data from said second component, wherein the integrated circuit transitions to a locked state during use to require continuous authentication throughout a subset of state transitions.

16. The integrated circuit of claim 15 wherein the unclonable characteristic of the first component is due to manufacturing variability.

17. The integrated circuit of claim 15 wherein the unclonable characteristic is based in at least partial dependence on an amount of delay in a signal path.

18. The integrated circuit of claim 17 wherein the signal path is non-linear and includes a plurality of selector elements, delay elements, and arbiters.

19. The integrated circuit of claim 15 wherein the unclonable characteristic is based in at least partial dependence on one of an amount of leakage current and an amount of dynamic current.

20. The integrated circuit of claim 15 wherein the unclonable characteristic is based in at least partial dependence on an SRAM-based identification.

21. The integrated circuit of claim 15 wherein the sequence of input data is one of a plurality of sequences each enabling traversal of a part of the finite state machine of the functional component.

22. The integrated circuit of claim 21 wherein the portion of the integrated circuit is a subset of the integrated circuit having a software program running thereon.

23. The integrated circuit of claim 21 wherein the portion of the integrated circuit is a subset of the integrated circuit performing predetermined data processes.

24. The integrated circuit of claim 15 and further comprising a plurality of unclonable components, each combination of unclonable components capable of traversing a portion of the finite state machine.

\* \* \* \* \*